United States Patent [19]

Niikawa et al.

[11] 4,404,451
[45] Sep. 13, 1983

[54] WELDING APPARATUS FOR MOTORCAR BODY

[75] Inventors: Ryo Niikawa; Susumu Wakou, both of Sayama, Japan

[73] Assignee: Honda Giken Kogyo Kabushiki Kaisha, Tokyo, Japan

[21] Appl. No.: 268,572

[22] Filed: May 29, 1981

[30] Foreign Application Priority Data

May 29, 1980 [JP] Japan ................................. 55-70786
May 29, 1980 [JP] Japan ................................. 55-70787
Jul. 4, 1980 [JP] Japan ................................. 55-90572

[51] Int. Cl.³ .......................... B23K 37/04; B23K 9/12
[52] U.S. Cl. ........................................ 219/80; 219/79; 219/161; 228/47
[58] Field of Search ...................... 219/125.1, 79, 161, 219/80, 119; 228/47

[56] References Cited

U.S. PATENT DOCUMENTS 1,645,711 10/1927 Meadowcraft ...................... 219/161
3,288,978 11/1966 Trygar ................................ 219/161

FOREIGN PATENT DOCUMENTS 2457343 6/1975 Fed. Rep. of Germany ........ 228/47

*Primary Examiner*—B. A. Reynolds
*Assistant Examiner*—Catherine M. Sigda
*Attorney, Agent, or Firm*—Armstrong, Nikaido, Marmelstein & Kubovcik

[57] ABSTRACT

Welding apparatus for a motorcar body comprising a pair of welding jig units positioned on opposing sides of a combining station which are movable laterally for positioning and holding thereon side panels of the body and a carrier movable between the combining station and a setting station for positioning and holding thereon the floor panel and the roof panel of the motorcar body. The structures of the carrier and the welding jig units are disclosed. Each welding jig unit can be turnable between an inwardly facing position and an outwardly facing one.

4 Claims, 13 Drawing Figures

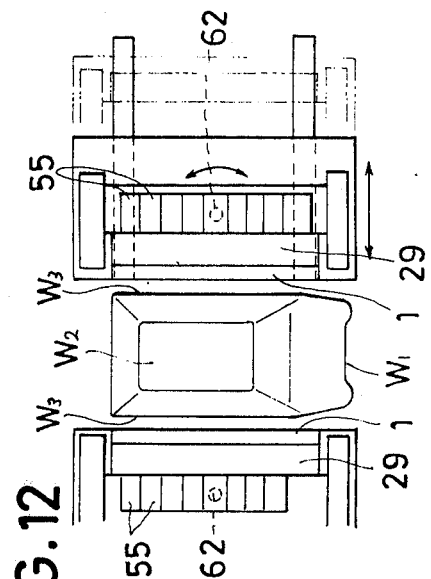
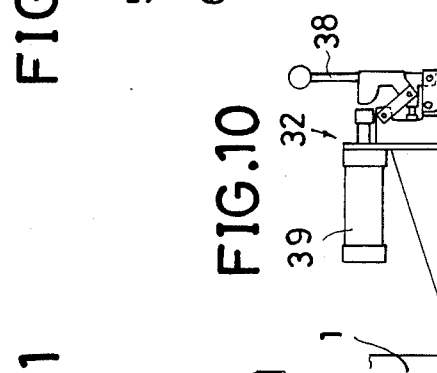
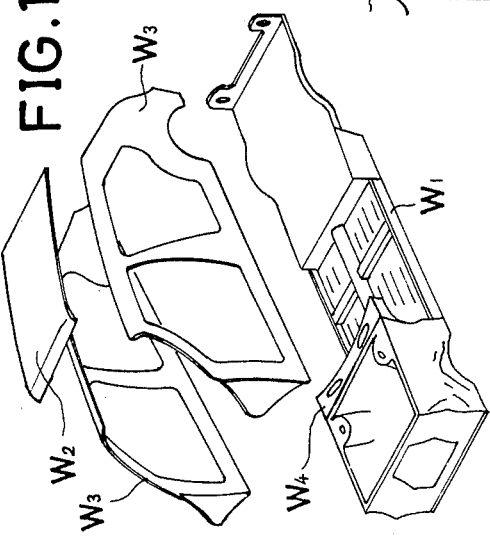
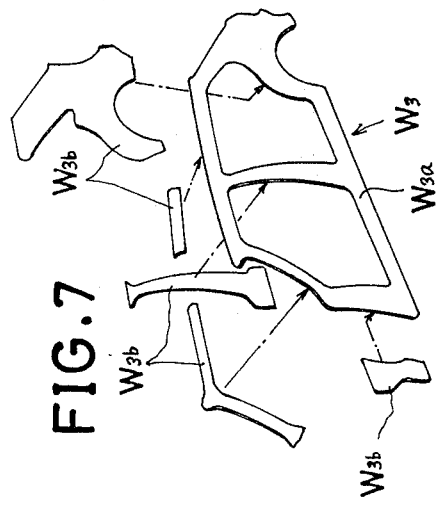

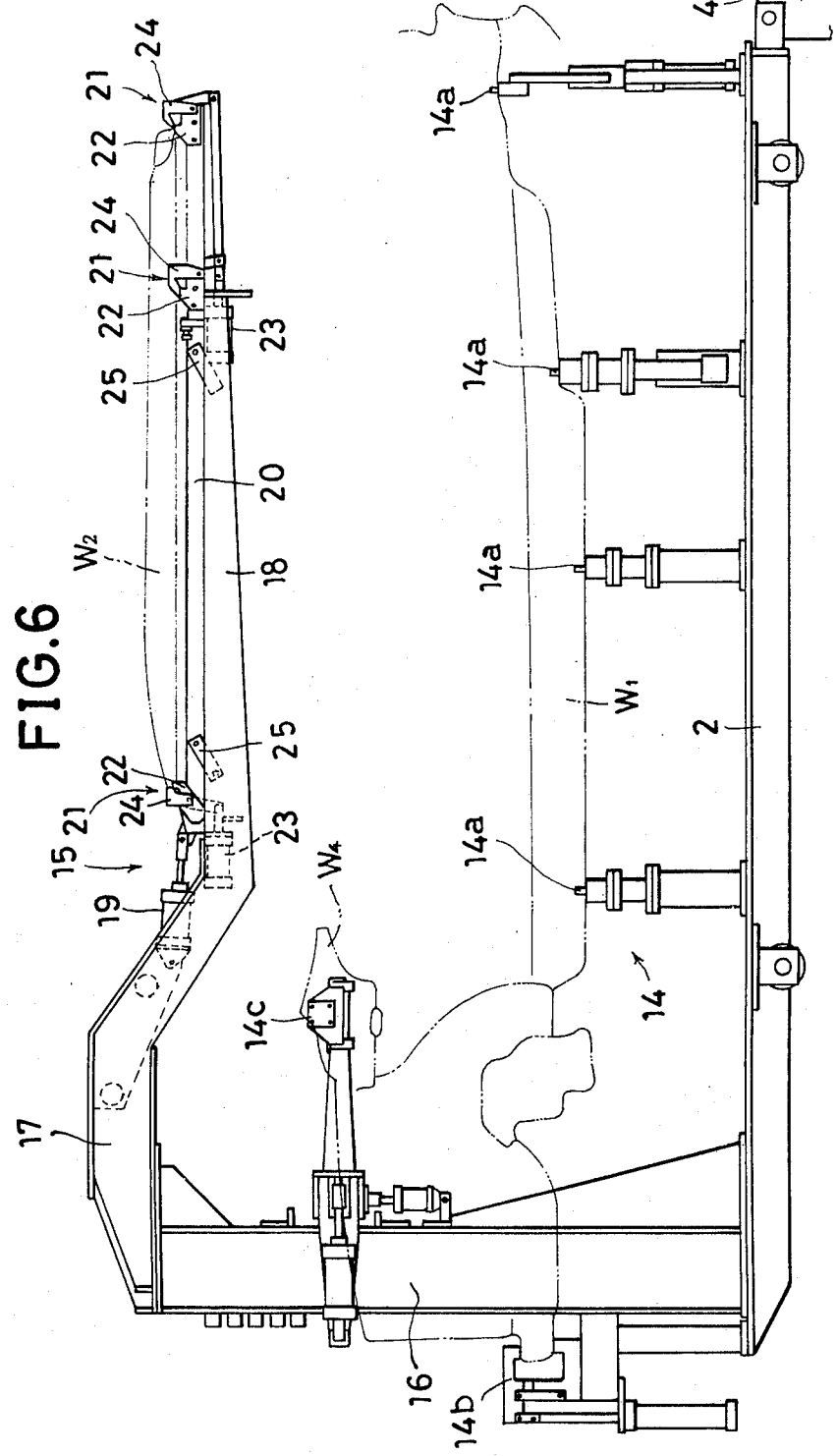

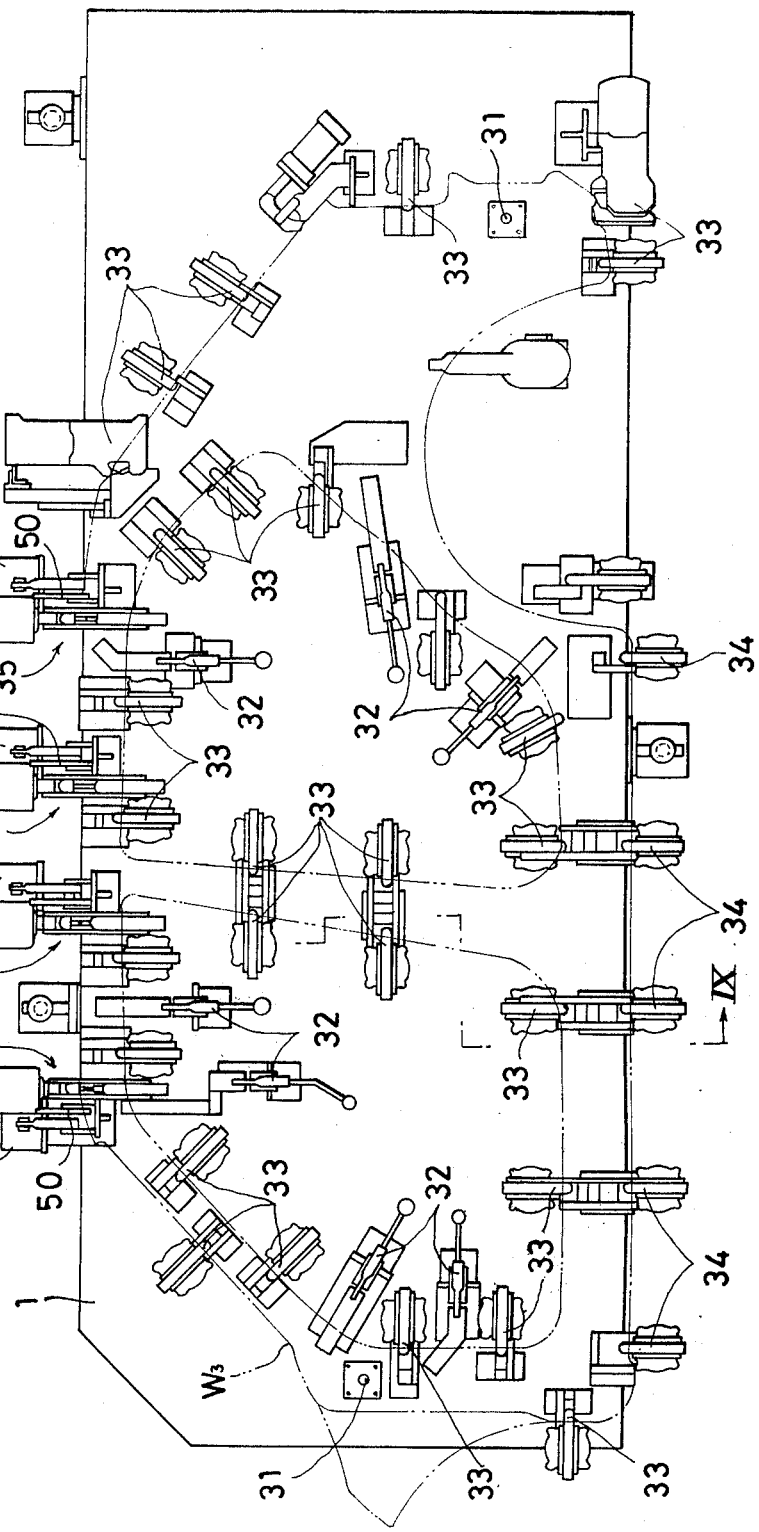

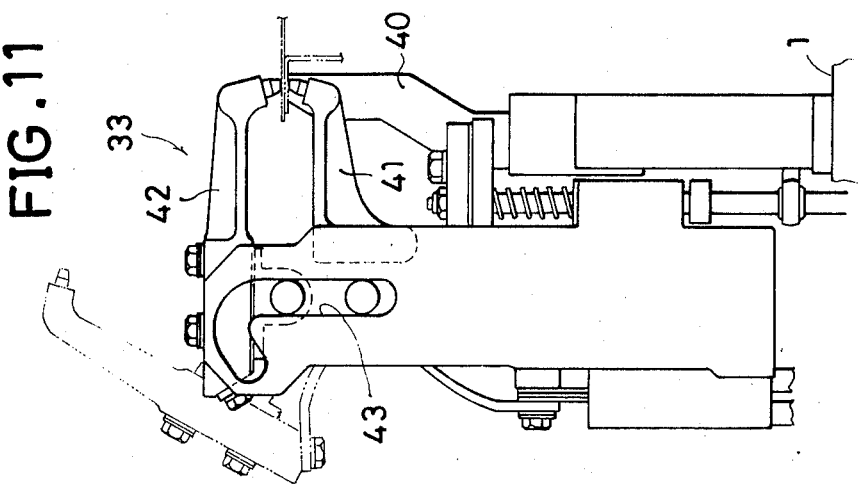
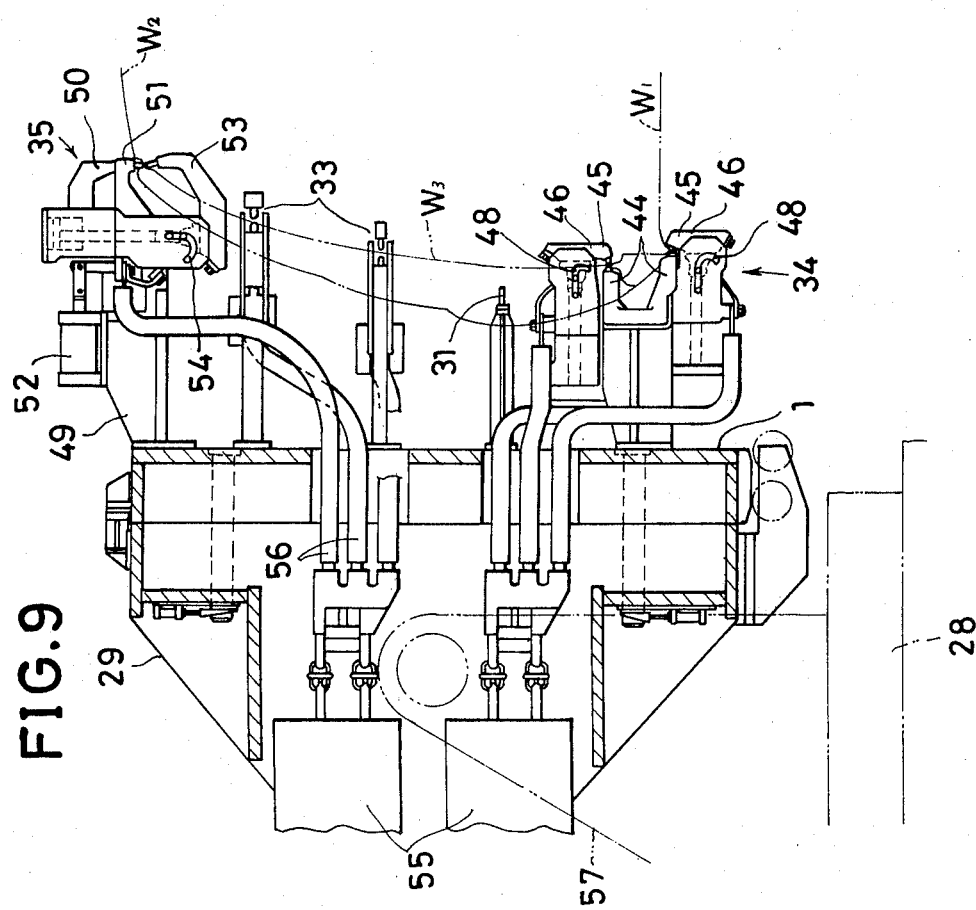

WELDING APPARATUS FOR MOTORCAR BODY

BACKGROUND OF THE INVENTION

This invention relates to a welding apparatus for assembling a motorcar body. The component parts of the motorcar body, that is, a floor panel, a roof panel and a pair of right and leftside panels are positioned and welded together at a combining station having on both lateral outsides of the combining position, a pair of right and left welding jig units.

It has been usual hitherto with this type of welding apparatus that the component parts are set in order on a carrier and are connected together temporarily by tack welding. The carrier is then moved to the combining station and the temporarily connected component parts are welded together completely at that station. This type of apparatus, however, is inconvenient in that the working efficiency is low because the component parts are connected together temporarily before being welded together completely. Additionally, the apparatus is complicated because the temporary assembled component parts are required to be positioned before being welded together at the combining station.

This invention has for its object to provide an apparatus free from those inconveniences. The component parts of a motorcar body, that is, a floor panel, a roof panel and a pair of right and left-side panels are positioned and welded together at a combining station having, on both lateral outsides thereof, a pair of right and left welding jig units. The welding jig unit on each side is constructed to be movable laterally and is arranged to position and hold thereon the side panel on the corresponding side. A carrier is provided which is movable between the combining station in front and a setting station in rear, and is arranged to position and hold thereon the floor panel and the roof panel.

BRIEF DESCRIPTION OF THE DRAWINGS

FIG. 1 is an exploded perspective view of a motorcar body assembled by using this invention apparatus;

FIG. 6 is an enlarged side view thereof;

FIG. 7 is an exploded perspective view of a side panel;

FIG. 8 is an enlarged front view of a welding jig unit;

FIG. 9 is a sectional view taken along the line IX—IX in FIG. 8;

FIG. 10 is an enlarged side view of one of the clamp members constituting a clamping means of the welding jig unit;

FIG. 11 is a side view of one of the welding members constituting a first welding means;

FIG. 12 is a top plan view of another example of this invention apparatus; and

FIG. 13 is a perspective view of further another example of this invention apparatus.

DETAILED DESCRIPTION OF THE PREFERRED EMBODIMENTS

Figure 2:
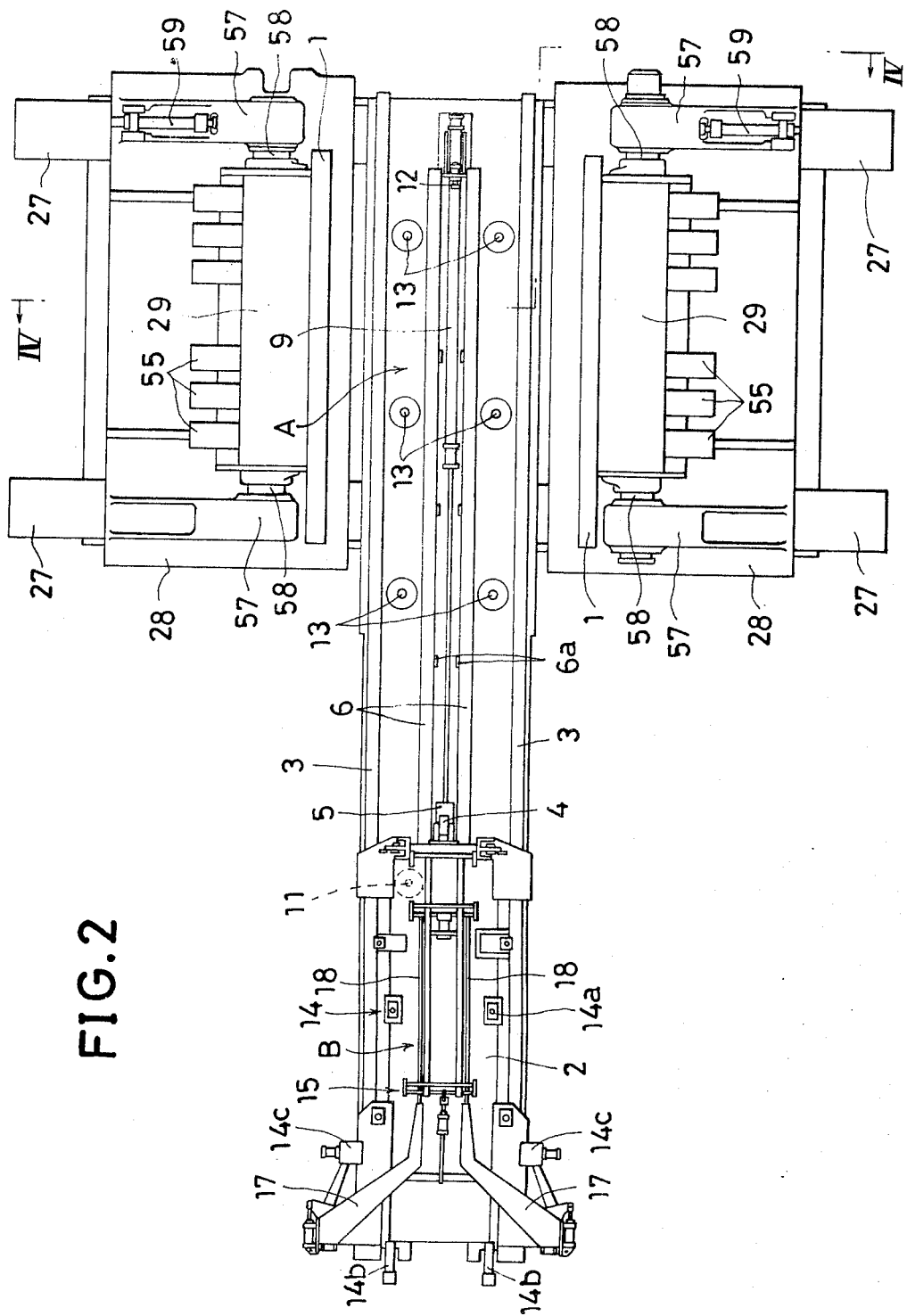
FIG. 2 is a top plan view of one example of this invention apparatus.
Figure 3:
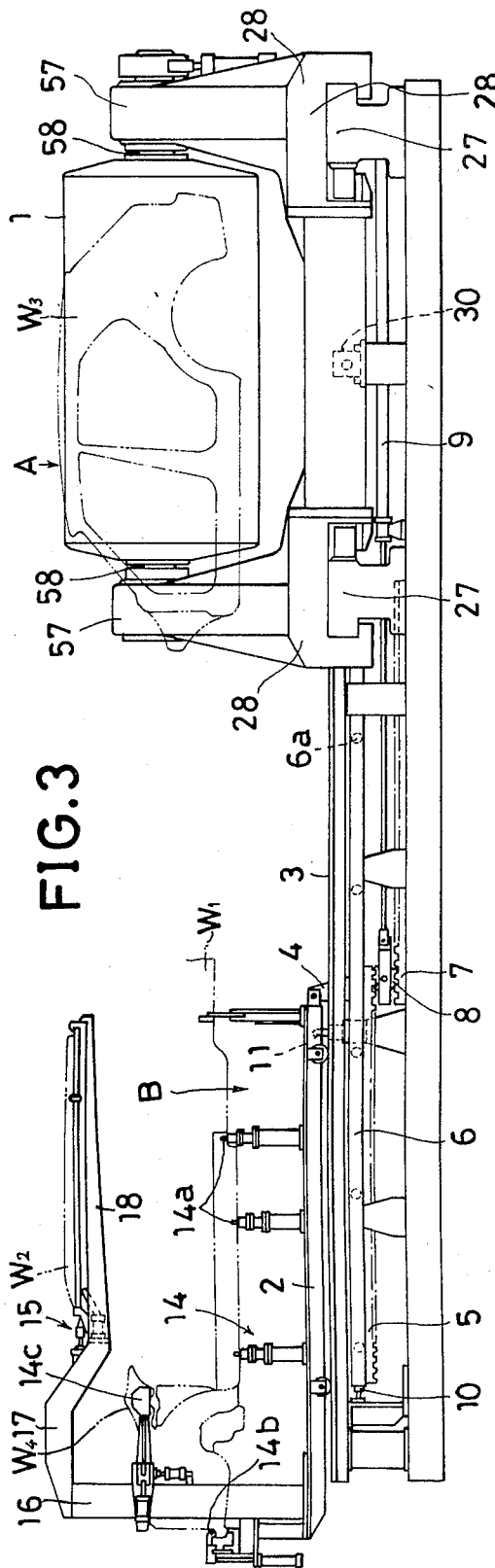
FIG. 3 is a side view thereof.
Figure 4:
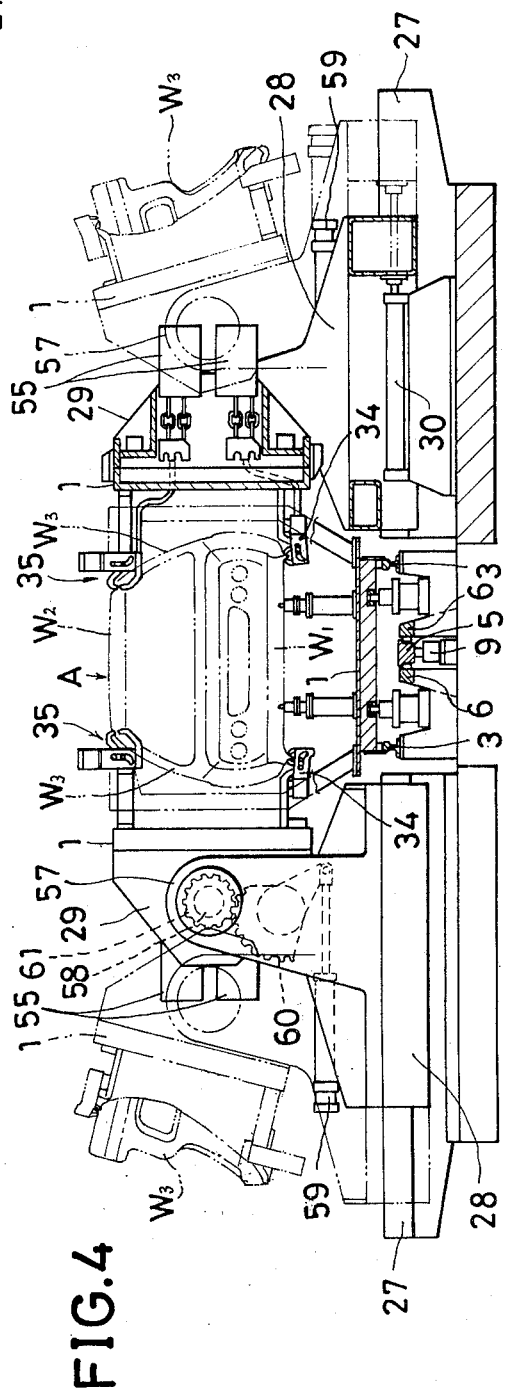
FIG. 4 is a sectional view taken along the line IV—IV in FIG. 2 under the condition that a carrier is at a combining station.

Embodying examples of this invention will be explained with reference to the accompanying drawings:

FIG. 1 shows component parts of a motorcar body, that is, a floor panel $W_1$, a roof panel $W_2$ and a pair of right and left-side panels $W_3,W_3$. The floor panel $W_1$ has thereon a dash-board-upper portion $W_4$. As shown in FIGS. 2 and 4, these component parts $W_1$, $W_2$, $W_3$, $W_3$ are welded together at a combining station A by a pair of right and left welding jig units 1,1 which are disposed on both lateral outsides of the combining station A.

According to this invention, the welding jig unit 1 on each side is constructed to be movable laterally and is arranged to position and hold thereon the side panel $W_3$ on the corresponding side, and there is provided a carrier 2 which is movable between the combining station A and a setting station B in the rear of the combining station A. The carrier 2 is also arranged to position and hold thereon the floor panel $W_1$ and the roof panel $W_2$ at the setting station B. These panels $W_1,W_2$ are carried to the combining station A by the carrier 2. The side panel $W_3$ on each side previously held on the welding jig unit 1 on the corresponding side is applied thereto from each lateral side thereof by the lateral movement of each welding jig unit 1 from outside towards inside, and welding of those panels is carried out under this condition.

More in detail, the carrier 2 is supported on a pair of right and left rails 3,3 installed along a travel path extending longitudinally between the combining station A and the setting station B. In order to enable the carrier 2 to be reciprocated along on the rails 3,3 between the combining station A and the setting station B, the carrier 2 is provided with a rack bar 5 connected thereto through a connecting member 4 provided on its forward end portion. The rack bar 5 is supported by a pair of right and left guide bars 6,6 extending along the travel path, through each pair of side rollers $6a,6a$ attached to the opposition inside surfaces of the guide bars 6,6. An operation cylinder 9 is provided having a wheel gear 8 which is meshed with the rack bar 5 and a rack bar 7 fixed on a machine base located below the rack bar 5.

Thus, the carrier 2 can be given a reciprocating motion by operating the operation cylinder 9. When the carrier 2 is moved to the setting station B, the carrier 2 is positioned at that setting station B by a stopper member 10, which is provided at the rear end of the travel path so as to be brought into abutment with the rack bar 5, and by a positioning pin 11 arranged to be brought into engagement with an engaging hole (not illustrated) made in the lower surface of the carrier 2. When the carrier 2 is moved to the combining station A, the same is positioned at that station by a stopper member 12, which is provided on the forward end of the travel path and is arranged to be brought in abutment with the rack bar 5 and by plural elevating positioning pins 13 which are arranged to be brought in engagement with plural engaging holes made in the lower surface of the carrier 2. At the time of welding, the carrier 2 is elevated to a predetermined height position by the action of the pins 13.

Figure 5:
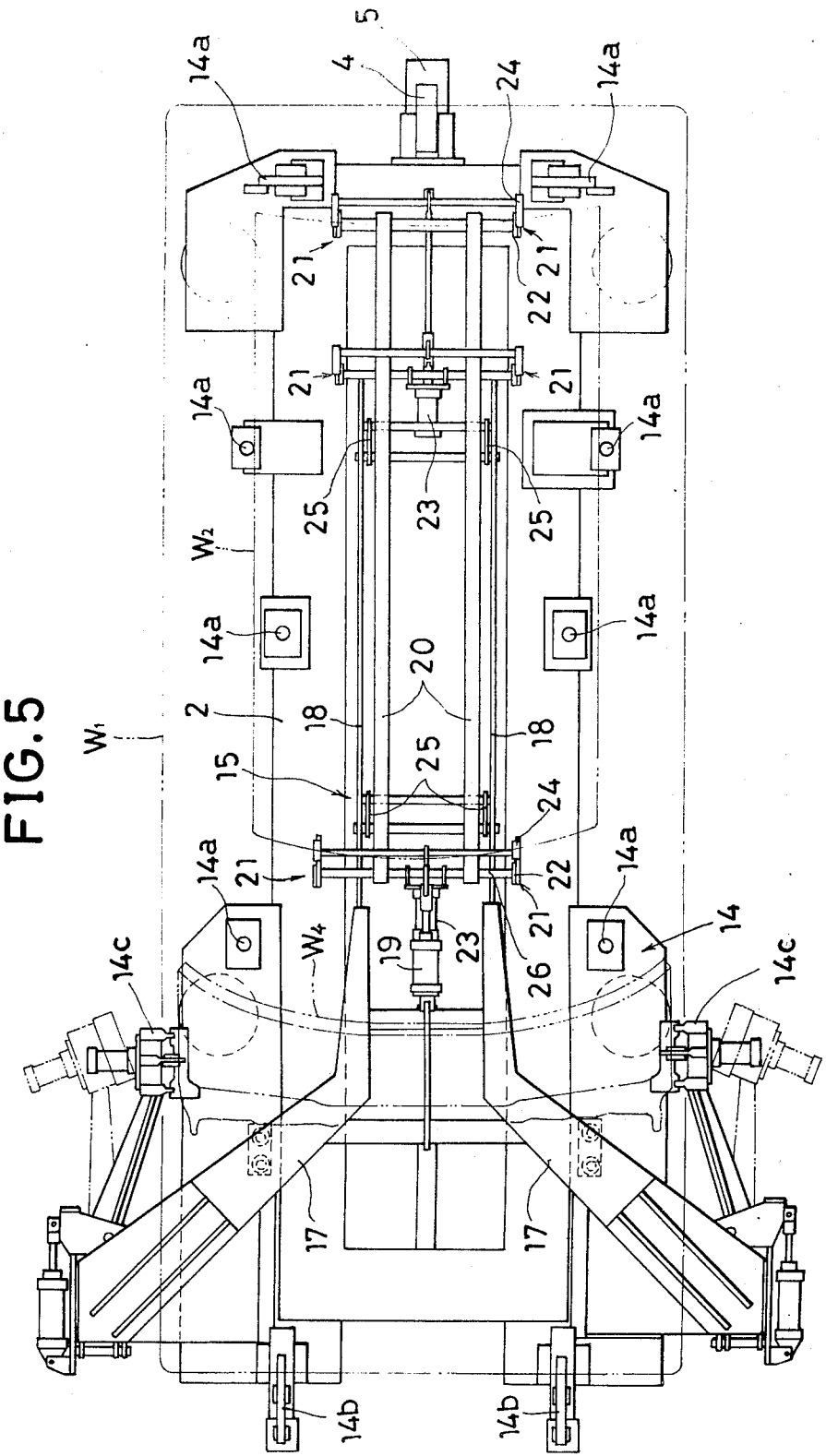
FIG. 5 is an enlarged top plan view of the carrier.

Further, as shown clearly in FIGS. 5 and 6, the carrier 2 is provided on its upper surface with a floor positioning means 14 for positioning and holding thereon the floor panel $W_1$ and is provided above the floor positioning means 14, with a roof clamping means 15 for positioning and clamping the roof panel $W_2$ so that a space for each side panel $W_3$ may be left between the roof panel $W_2$ and the floor panel $W_1$.

The floor positioning means 14 comprises plural pin members 14a arranged to be brought in engagement with plural drain holes made in the floor panel $W_1$, a pair of right and left clamp members 14b,14b for clamping one end edge portion of the panel $W_1$ and a pair of right and left swingable clamp members 14c,14c for clamping the dashboard-upper portion $W_4$ of the floor panel $W_1$.

In the illustrated example, as a result of considering the facilitating of positioning of the floor panel $W_1$ in relation to the side panel $W_3$ on each side, the roof clamping means 15 is so constructed that the roof panel $W_2$ may be clamped thereby so as to be movable upwards and downwards. Namely, the clamping means 15 comprises a supporting frame 20 which is long in the longitudinal direction and is so provided between a pair of right and left brackets 18,18 attached to arm members 17,17 extending from the upper end portions of a pair of right and left supporting pillars 16,16 provided on the carrier 2 as to be movable upwards and downwards by operation of a cylinder 19. Plural pairs of right and left clamp members 21,21 are disposed on the supporting frame 20 at proper longitudinal intervals. Each of those clamp members 21,21 comprises a receiving member 22 for receiving the roof panel $W_2$ and a clamp claw 24 which is arranged to be opened and closed in relation thereto by operation of an operation cylinder 23. Furthermore, in detail, the supporting frame 20 is so supported as to be movable upwards and downwards by the bracket 18 on each side thereof through a pair of front and rear parallel links 25,25, and a connecting rod 26 provided on the rear end of the supporting frame 20. The connecting rod 26 is connected to a piston rod of the cylinder 19 supported between the arm members 17,17 so that the supporting frame 20 may be moved upwards and downwards by the operation of the cylinder 19. Further, a connecting rod 24a connecting between the clamp claws 24,24 in each pair of clamp members 21,21 is connected to a piston rod of each corresponding operation cylinder 23 supported on the supporting frame 20 so that the clamp claws 24,24 may be given a clamping operation by operating of the operation cylinders 23,23.

As far as the clamp member 21 is concerned, it is enough to provide two pairs thereof, that is, one pair thereof in front and another pair in rear. If, however, three pairs thereof (as shown in FIGS. 5 and 6) or more than that are provided, it is advantageous in that even different kinds of roof panel $W_2$, which are different in length at the time of change in a model of the motorcar, can be clamped thereby.

The welding jig unit 1 on each side is fixedly provided on a mounting base 29 provided on a movable base 28 which is supported slidably in a lateral direction on a pair of front and rear guide bars 27,27 extending laterally and outwards from the combining station A. The unit 1 is thereby movable together with the movable base 27 by operation of an operation cylinder 30 connected to the movable base 28.

The side panel $W_3$ on each side comprises an outer part $W_{3a}$ and plural inner parts $W_{3b}$ which is to be welded to the inner surface thereof as shown in FIG. 7. It is optional that these parts may be previously welded together and the resultant side panel $W_3$ is positioned and held on the welding jig unit 1 by positioning pins 31 provided on the unit 1. In the illustrated example, however, in order that the outer part $W_{3a}$ and the inner parts $W_{3b}$ may be welded together to form the side panel $W_3$ on the welding jig unit 1, as shown in FIGS. 8 and 9, the welding jig unit 1 is provided thereon with a clamp means comprising plural clamp members 32,32 for clamping together the inner parts $W_{3b}$ and the outer part $W_{3a}$ which is previously positioned by the positioning pins 31. A first welding means is provided comprising plural welding members 33 for welding together these parts $W_{3a}$, $W_{3b}$ under their clamped condition to form the side panel $W_3$. The welding jig unit 1 is additionally provided thereon with a second welding means comprising plural welding members 33,33 for welding the side panel $W_3$ under its positioned condition to the floor panel $W_1$ held on the carrier 2. A third welding means is also provided comprising plural welding members 34,34 for welding the side panel $W_3$ to the roof panel $W_2$ held on the carrier 2.

Each of the foregoing clamping members 32,32 is as shown in FIG. 10. Namely, the same comprises a clamp arm 37 pivotally provided on a bracket 36 projecting from the welding jig unit 1, an operation handle 38 pivotally provided on the arm 37 and having a toggle joint moving mechanism, and an operation cylinder 39 for releasing the handle 38.

Each of the plural welding members 33,33 constituting the first means is as shown in FIG. 11. Namely, the same comprises a receiving member 40 attached to the welding jig unit 1 through a bracket and a welding gun 41. A movable gun arm 42 of the welding gun 41 is constructed to be opened and closed while being guided by a guide opening 43.

Each of the welding members 34,34 constituting the second welding means is as shown in FIG. 9. Namely, the same comprises a receiving member 44 in a yoke form attached through a bracket to the welding jig unit 1 and a welding gun 45. A movable gun arm 46 of the welding gun 45 is constructed to be opened and closed while being guided by a guide opening 48.

Each of the welding members 35,35 constituting the third welding means is also as shown in FIG. 9. Namely, the same comprises a clamper 50 supported on a bracket 49 projecting from the welding jig unit 1 and a welding gun 51. A clamp arm of the clamper 50 is constructed to be clamped in parallel with a stationary gun arm of the welding gun 51 by an operation cylinder 52. A movable gun arm 53 of the welding gun 51 is constructed to be opened and closed while being guided by a guide opening 54.

Referring to the drawings, numeral 55 denotes a transformer mounted on the mounting base 29. A plurality of transformers 55 are provided and are electrically connected to the first, the second and the third welding means mentioned before.

It would be inconvenient if the welding jig unit 1 on each side remained at its inwardly facing position when the outer part $W_{3a}$ and the inner parts $W_{3b}$ for forming the side panel $W_3$ are set thereon and welded together to form the side panel $W_3$. Such an inconvenience is involved also in the case wherein the side panel $W_3$ previously formed is set thereon.

Accordingly, in order to avoid such inconveniences, in the illustrated example, the mounting base 29 for fixing the welding jig unit 1 is pivotally supported through a turning shaft 58 on a pair of right and left supporting arms 57,57 standing upright on the movable base 28, and a swingable gear 60 arranged to be moved to swing by being connected to an operation cylinder 59 provided on the movable base 28 is in meshed engagement with a ring gear 61 mounted on the shaft 58. Thus, the operation of the operation cylinder 59, the mounting base 29 and, accordingly, the welding jig unit 1 fixed thereto may be given a reciprocable turning movement between its inwardly facing position and its outwardly facing position. Consequently, the forming work of the side panel $W_3$ on the same can be carried out under the condition that the welding jig unit 1 faces outwards as shown by chain lines in FIG. 4.

A mechanism for turning the welding jig unit 1 is not limited to the above and may be modified into the type, for instance, such as that shown in FIG. 12. The mounting base 29 can be provided turnably on the movable base 29 through a shaft 62 connected to the lower surface thereof so that the same may be rotated about the shaft 62.

FIG. 13 shows a further modified case wherein the mounting base 29 is supported by a pair of right and left swing arms 64,64 which are swingable by respective cylinders 63 so that the welding jig unit 1 may be moved inwards and outwards thereby. In this case, the mounting base 29 is pivotally supported on the pair of swing arms 64,64 through a shaft 65, and thus the welding jig unit 1 may become turnable.

Next, tne operation of the invention apparatus will be explained as follows:

First, the floor panel $W_1$ and the roof panel $W_2$ are positioned and clamped on the carrier 2 at the setting station B. At the combining station A, the welding jig unit 1 on each side is moved outwards and is turned to its outwardly facing position. The outer part $W_{3a}$ and the inner parts $W_{3b}$ for the side panel $W_3$ on each side are clamped to the welding jig unit 1. The respective members 33 of the first welding means are operated under their clamped condition so as to form the side panel $W_3$. During this operation, the carrier 2 onto which the floor panel $W_1$ and the roof panel $W_2$ have been set is moved to the combining station A, and is positioned in height by using the elevating positioning pins 12 at the combining station A. Each welding jig unit 1 carrying the completed side panel $W_3$ is turned to its inwardly facing position and is then moved inwards as far as the side panel $W_3$ held thereon is brought into abutment with the floor panel $W_1$ held on the carrier 2. When the two panels $W_1,W_3$ abut on on each side, the respective members 35 of the second welding means are operated. The floor panel $W_1$ and the side panel $W_3$ are thereby welded together. Thereafter, the roof panel $W_2$ held on the carrier 2 is brought into abutment with the side panel $W_3$ on each side by the supporting frame 20 with the clamping means 15 supporting the roof panel $W_2$ moving downwards by the operation of the cylinder 19. When the two panels $W_2,W_3$ on each side abut, the respective members 36 of the third welding means are operated, and thereby the roof panel $W_2$ and the side panel $W_3$ are welded together. Thus, the welding process is completed to form a motorcar body.

Thus, according to this invention, the two welding jig units on the opposite sides of the combining station are arranged to hold the respective side panels, and the carrier which is movable between the combining station and the setting station is arranged to hold the floor panel and the roof panel. Thus, the setting operation is simplified because it is sufficient only with setting, at the setting station, the floor panel and the roof panel, and additionally, since the floor panel and the roof panel are conveyed by the carrier to the combining station and are combined at that station with the respective side panels already set on the respective welding jig units. Working efficiency can be improved, the positioning means can be simplified and, thus, automating of the combining procedures can be facilitated.

What is claimed is:

1. A welding apparatus for a motorcar body which includes a floor panel, a roof panel, and a pair of left and right-side panels, each having component parts, which comprises:
   a setting station,
   a combining station displaced from said setting station along a longitudinal axis;
   a pair of welding jig means positioned on opposing sides of said combining station for moving said pair of side panels to said combining station and for holding said side panels in a desired position at said combining station, said pair of welding jig means being moveable laterally of said axis; and
   carrier means moveable along said axis from said setting station to said combining station for simultaneously moving both said roof panel and said floor panel from the setting station to the combining station and for positioning and holding both said roof panel and said floor panel in desired positions at said combining stations.

2. A welding apparatus as claimed in claim 1 wherein said carrier means comprises a floor positioning means for positioning the floor panel, and a roof clamping means for clamping the roof panel, said roof clamping means together with the roof panel being movable upwards and downwards such that a space for the side panel of each side may be left between the roof panel and the floor panel positioned by the foregoing floor positioning means.

3. A welding apparatus as claimed in claim 1 wherein the welding jig unit means on each side comprises a clamping means for clamping component parts of the side panel, a first welding means for welding together the component parts to form the side panel, a second welding means for welding the side panel to the floor panel, and a third welding means for welding the side panel to the roof panel.

4. A welding apparatus as claimed in claim 1 or claim 3 wherein each welding jig means is moveable laterally of said axis between a first position at said combining station and a second position laterally away from the combining station is turnable about a pivot axis parallel to said longitudinal axis through approximately 180° between an inwardly facing position and an outwardly facing position relative to said combining station, whereby a side panel can easily be loaded onto the welding jig means while it is in the second position facing outwardly, pivoted to face inwardly, and moved to the first position at the combining station to be joined with the roof panel and the floor panel on the carrier means.

* * * * *